J. WODSEDALEK.
DRIVING MECHANISM.
APPLICATION FILED FEB. 16, 1917.
1,233,945.
Patented July 17, 1917.
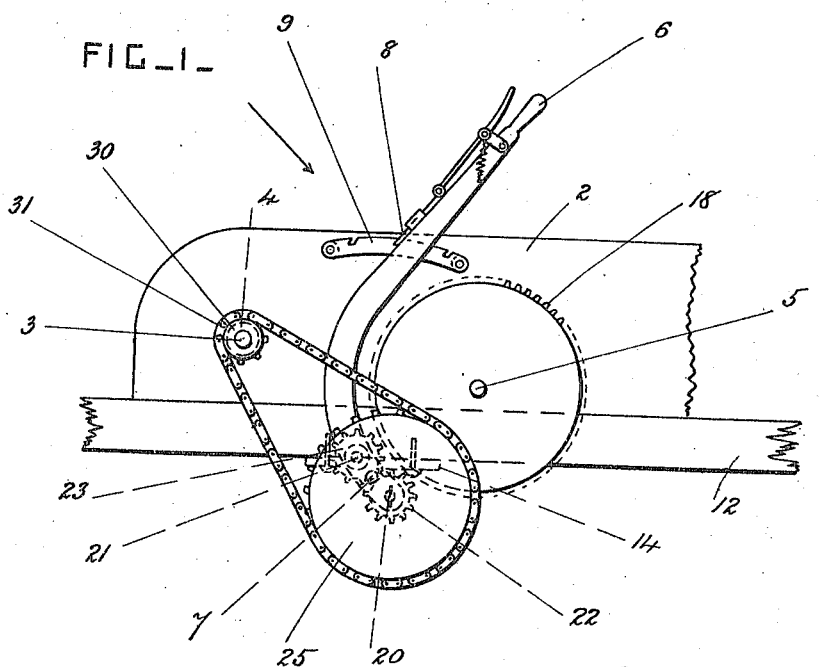
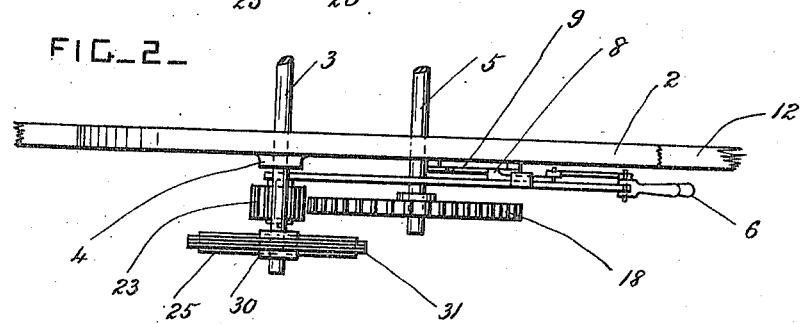
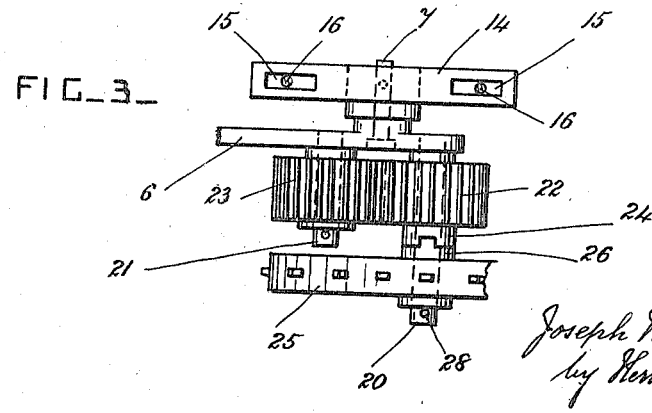
Inventor.
Joseph Wodsedalek
by Herbert W. Jenner
Attorney.

UNITED STATES PATENT OFFICE.

JOSEPH WODSEDALEK, OF ALGOMA, WISCONSIN.

DRIVING MECHANISM.

1,233,945. Specification of Letters Patent. Patented July 17, 1917.

Application filed February 16, 1917. Serial No. 149,018.

*To all whom it may concern:*

Be it known that I, JOSEPH WODSEDALEK, a citizen of the United States, residing at Algoma, in the county of Kewaunee and State of Wisconsin, have invented certain new and useful Improvements in Driving Mechanism; and I do hereby declare the following to be a full, clear, and exact description of the invention, such as will enable others skilled in the art to which it appertains to make and use the same.

This invention relates to driving mechanism used on rotary feed cutters and other similar machines; and it consists in the novel construction and combination of the parts hereinafter fully described and claimed whereby the feed mechanism is stopped and started and whereby the direction of motion of the feed devices is changed without changing the direction of the motion of the cutting mechanism.

In the drawings, Figure 1 is a front view of a driving mechanism constructed according to this invention. Fig. 2 is an end view looking in the direction of the straight arrow in Fig. 1. Fig. 3 is a detail view of the reversing mechanism.

The feed cutting machine has a frame 2 a portion only of which is shown. The main shaft 3 which drives the cutting mechanism is journaled in bearings 4 on the frame, and the rotary feed shaft 5 is also journaled in the frame. The feed cutting machine is not more fully illustrated as it is of any approved construction.

A reversing lever 6 is provided and its lower end portion is pivoted on a pin 7 which projects laterally of the frame and its support 12 below the main shaft 3. This reversing lever is provided with a retractible retaining catch 8 of any approved form which engages with a notched quadrant plate 9 secured to the frame, so that the lever can be locked in its middle and end positions. The pin 7 preferably projects from a box or bracket 14 which has slots 15 in it. Bolts 16 pass through the slots 15 and secure the box to the support, and the slots permit the position of the pin to be adjusted longitudinally with great accuracy.

The feed shaft 5 has a toothed wheel 18 secured on it, and the lower part of the lever 6 has two pins 20 and 21 which project from it laterally and which are arranged upon opposite sides of its pivot. Two toothed pinions 22 and 23 are provided, and are journaled loosely on the two pins 20 and 21, and are arranged in gear with each other. One of these pinions 22 has a clutch member 24 on one side, and 25 is a sprocket wheel which is slidable on the pin 20 and which has a clutch member 26 for engaging with the clutch member 24. The two clutch members are held constantly in engagement with each other by means of a cross-pin 28 or other removable fastening device on the projecting end portion of the pin 20.

The main shaft 3 has a sprocket wheel 30 permanently secured on it, and 31 is an endless drive chain of any approved make which passes over the two said sprocket wheels and drives the feed shaft from the main shaft.

The sprocket wheel 25 is removable and sprocket wheels of different diameter are provided each having a similar clutch member and adapted to be interchanged with the sprocket wheel 25 so as to alter the ratio of the speed of the feed shaft to that of the main shaft.

The direction of the motion of the feed shaft is changed by placing the two pinions 22 and 23 alternately in driving gear with the toothed wheel 18, by means of the reversing lever; and the feed mechanism is stopped altogether by placing the lever in its middle position, as shown, so that neither pinion gears into the wheel 18.

The adjustability of the lever pivot enables the toothed pinions to be arranged to gear with the wheel with great accuracy, and so that the liability of stripping the teeth from the pinions and wheel is obviated, same being a great drawback to many machines of this class. The drive chain is adjusted in length when the sprocket wheel is changed, and any suitable tightener for taking up the slack of the drive chain may be used in connection with it.

What I claim is:

1. A driving mechanism comprising a revoluble main shaft, a sprocket wheel secured on the said shaft, a feed shaft, a toothed wheel secured on the feed shaft, a pivoted reversing lever provided with pins arranged one on each side of its pivot, two toothed pinions journaled on said pins and gearing into each other, one of the said pinions being provided with a clutch member, an interchangeable sprocket wheel provided with a clutch member for engaging the aforesaid clutch member, a removable device for retaining the last said sprocket wheel on its pin, and a drive chain passing over the said sprocket wheels, said pinions being moved alternately into and out of gear with the toothed wheel to change the direction of the motion of the feed shaft.

2. A driving mechanism comprising a revoluble main shaft, a sprocket wheel secured on the said shaft, a feed shaft, a toothed wheel secured on the feed shaft, a support for the said shafts, a longitudinally adjustable bracket secured to the said support below the main shaft and provided with a laterally projecting pivot, a reversing lever mounted on the said pivot and provided with pins arranged one on each side of its pivot, two toothed pinions journaled on said pins and gearing into each other, one of the said pinions being provided with a clutch member, an interchangeable sprocket wheel provided with a clutch member for engaging with the aforesaid clutch member, a removable device for retaining the last said sprocket wheel on its pin, and a drive chain passing over the said sprocket wheels, said pinions being moved alternately into and out of gear with the toothed wheel to change the direction of motion of the feed shaft.

In testimony whereof I have affixed my signature.

JOSEPH WODSEDALEK.

Copies of this patent may be obtained for five cents each, by addressing the "Commissioner of Patents, Washington, D. C."